Patented Mar. 4, 1952

2,587,955

UNITED STATES PATENT OFFICE 2,587,955

CORROSION PREVENTIVE COMPOSITION

Emmett Raymond Barnum, Berkeley, Calif., assignor to Shell Development Company, San Francisco, Calif., a corporation of Delaware No Drawing. Application April 28, 1947, Serial No. 744,535

1 Claim. (Cl. 252—34)

This invention relates to a corrosion inhibiting composition. More particularly this invention pertains to corrosion inhibiting compositions having the ability of displacing moisture, corrosion producing materials, and the like, from metal surfaces, and forming thereon a tenacious protective film, which is impervious to moisture and other corrosive contaminants.

It is well known that moisture, corrosive fluids and gases, e. g. $H_2S$, $SO_2$, etc., readily attack not only metallic surfaces but non-metallic surfaces, and cause corrosion, rusting, pitting and other damage to such surfaces. Also aqueous solutions, when in contact with a metallic surface, readily attack it and cause corrosion and rusting. Under certain conditions the problem of corrosion becomes exceedingly serious because once started it becomes progressively accelerated. Thus, oils containing small amounts of water become very corrosive to metals in contact therewith. This is due to the fact that oils and particularly liquid petroleum hydrocarbons are very good solubilizers of oxygen and any moisture present therein becomes surrounded by an almost inexhaustible store of oxygen. Moisture under such conditions is inhibited from evaporating and since the rate of transfer of oxygen from hydrocarbons, such as mineral oil or gasoline, to water is limited, ideal conditions for rusting and corrosion are set up. The presence of electrolytes and formation of corrosive decomposition products in oils and the like also greatly increase the rate of corrosivity.

Under conditions where, in addition to those enumerated, elevated temperature is encountered, corrosion activity is greatly accelerated. Thus moisture, salt sprays and other contaminants or acidic composition products and corrosive gases formed during operation of engines, such as internal combustion engines, diesel engines, aircraft engines, turbines and various other machinery and industrial equipment, readily attack and rust or corrode contacting metal surfaces. The damage caused thereby is not to the metal surface alone for rust particles frequently break off and enter the circulating system of engines and cause plugging, clogging, and fouling of conduit lines, columns, plates, and the lines of cracking equipment, tubes, evaporators, etc.

Corrosion of alloyed bearings and other alloyed surfaces due to contact with water can attain such an aggravated stage as to cause great fatigue stresses to be set up, which ultimately result in cracking of the metal.

The problem is equally serious when combatting rusting and corrosion of steel drums, storage tanks used to store gasoline, hydrocarbon oils and the like. Moisture adhering to pickled steel, quenched steel, equipment such as instruments, engine starters and generators on landing crafts, hydraulic systems, machinery for metal processing and the like are also extremely susceptible to corrosion and must be protected.

Besides metal surfaces, materials such as rubber equipment, electrical insulation materials, brake and clutch lining, etc. suffer damage when in contact with water, aqueous solutions, corrosive fluids and the like.

Such contaminants also have a detrimental effect upon the medium in which they are dispersed. In lubricating and liquid fuel mediums they cause oxidation, interfere with the functioning of additives or decrease their efficiency, form emulsions and thickening of the fluid and generally cause gumming and sticking of movable parts.

Countless materials and compositions have been tried for protecting surfaces by forming on said surface a non-reactive corrosion protective film having lubricating properties. Metal surfaces have been coated or treated with greases, fatty compositions, waxes, organic compounds, e. g. organic acids, amines; inorganic compounds and the like in order to protect them against corrosion. In almost all cases where no chemical reaction occurred between the surface treated and the corrosion or rust inhibitor very little benefit is derived. This is due to the fact that non-chemical reactive inhibitors are incapable of penetrating the surface being protected and are incapable of displacing the contaminant therefrom. In cases where such inhibitors are able to form protective coatings on surfaces they are easily displaced by moisture or rupture readily. They are relatively ineffective against corrosive acidic materials and hot gases such as are formed during operation of combustion and turbine engines and are easily destroyed when applied to surfaces which are subjected to high temperatures.

It is an object of this invention to protect metal surfaces in contact with corrosive contaminants against corrosion by treating said surfaces with a composition having the property of displacing said contaminants from said surface and forming thereon an impermeable tenacious protective film. It is another object of this invention to protect metallic surfaces with a water displacing, water resistant non-corrosive protective film having no detrimental effect upon the metal surface treated. It is still another object of this invention to provide metal surfaces with a water and acid resistant film which is not susceptible to rupture even at elevated temperatures and which could be readily removed when desired. Still another object of this invention is to form protective film on metal surfaces which are not detrimental to contacting fluids and which do not interfere with their function as lubricants, hydraulic fluids, quenching agents and the like. Another object of this invention is to form a composition of matter capable of protecting metal surfaces from corrosion, said composition also possessing lubricating properties. Another object is to produce a film forming metal protective compositions which are stable and readily miscible with petroleum hydrocarbons such as lubricating oils or other inert organic carriers and the like. It is also another object of this invention to treat surfaces whether metallic or non-metallic so as to form thereon a protective film which is impervious to moisture and corrosive fluids, and which can be readily removed when desired. Other objects will be apparent from the following description.

It has now been discovered that various metals and other material which are conducive to corrosive influences can be protected simply and effectively by treatment with a composition of matter comprising essentially a mixture of a major amount of a liquid organic carrier and a minor amount of oxazoline salts of organic acids. Thus, the oxazolines may be derived from amino hydroxy compounds through their fatty amides, or the oxazolines may be made by reacting an amino hydroxy compound with a nitrile. Any other procedure may be followed to prepare these types of heterocyclic compounds.

In preparing the oxazolines through their fatty acid amides, a suitable amino hydroxy compound is reacted with a desirable aliphatic carboxylic acid at an elevated temperature to yield an amide. The temperature is then increased so as to split out water and form the oxazoline. The temperature for the initial amide formation and final oxazoline formation depends upon the reacting materials employed and generally is within the range of 150° to 170° C. for the initial reaction and around about 250° C. for the final reaction.

Examples of suitable hydroxy amino compounds are the primary aliphatic amines having a hydroxy group on the carbon adjacent to the carbon atom bearing an amino radical. Compounds of this type can be specifically illustrated by monoethanol amine, 2-methyl-2-amino-1-propanol, 2-methyl-2-amino-1, 3-propanediol,-2-ethyl - 2 - amino-1, 3 - propanediol, - tris(hydroxy methyl) amino methane, 2-amino-1-butanol, 2-amino-1-pentanol, 2-amino-1-ethanol, 2-amino-3-butanol, 3-amino-4-pentanol, 3-amino-4-hexanol, 2-amino-3-heptanol and the like.

Oxazolines prepared in the manner indicated above or by any other suitable means are then reacted with a suitable acid ricinoleic acid.

Some specific salts of organic acids are listed below in such a manner as to indicate that any of the heterocyclic parts may be combined with any of the acidic parts to form the salts of this invention.

*Heterocyclic part*

2-heptyl-4-hydroxylmethyl-4-ethyloxazoline
Tridecyl-4-hydroxylmethyl-4-ethyloxazoline
2-octyl-4-hydroxylmethyl-4-ethyloxazoline
2-hendecyl-4-hydroxylmethyl-4-ethyloxazoline
2-octyloxazoline
2-hendecyloxazoline
2-hendecyl-4,4-dimethyloxazoline
2-heptadecyl-4,4-dimethyloxazoline
2 - pentyl - 4,5 - dimethyl - 4 - hexanooxyethyl-2-oxazoline
2 - undecyl - 4 - methyl - 4 - lauroxymethyl - 2-oxazoline
2-undecyl-4,4-dimethyl-5-phenyl-2-oxazoline
Dioctyloxazole
Ethyloctyloxazole
Diethyloctyloxazole
Diheptyloxazole
Butyl-oxazolidine
Diethyl-oxazolidine
Diheptyl-oxazolidine
Ethyloctyloxazolidine
Propyloctyloxazolidine
Propyloctyloxazolidine
Ethyloctylisoxazole
Dioctylisoxazole
Dibutylisoxazole
Propylbutylisoxazole and the like.

The preferred compounds are the oxazoline salts of ricinoleic, although any of the other salts and/or their mixtures may be used.

Corrosion inhibiting additives of this invention are prepared by simple admixing an oxazoline, and the like with a desirable acid in a vessel either at room temperature or slightly elevated temperature with constant stirring until the reaction is completed. The additive is then admixed with a suitable liquid organic carrier varying in amounts from less than 0.5% by weight to more than 20 to 25% by weight.

The dispersing medium is substantially a water-immiscible hydrocarbon. These carriers or dispersing mediums are preferably derived from petroleum hydrocarbons and may include various petroleum naphtha cuts, mineral spirits, mineral seal oil, kerosene, gas oils, mineral oil, waxes, kerosene $SO_2$ extract, aromatic solvents, petroleum ether, aromatic hydrocarbons such as benzene, p-xylene, o-xylene, m-xylene, cumene, butyl benzene; paraffinic hydrocarbons e. g. normal hexane, dimethyl pentane, octane, nonane, undecane, dodecane; cycloparaffin, e. g. cyclohexane, methylcyclohexane, isopropylcyclohexane; halogenated hydrocarbons such as chlorinated kerosene, carbon tetrachloride, chloroform, synthetic oils, e. g. olefin polymers, polymerized alkylene oxides, alkyl ester e. g. 2-ethylhexyl sebacate, ethyl ricinoleate, dioctyl phthalate, etc. The dispersing medium constitutes around about 75% to above 95% of the composition, depending upon its viscosity, penetrability and particular application or condition under which it is used.

To illustrate the pronounced corrosion inhibiting properties additives of this invention possess the following tests were conducted and the results tabulated.

Aluminum strips of 1 x 2 inches were dipped into the designated oil for 1 minute, drained for 24 hours at room temperature, immersed in an aqueous solution of 5.7% sodium chloride and 0.3% hydrogen peroxide for 24 hours, revived, cleaned and examined for corrosion.

| Oil | Additive | Per Cent Corroded after 24 hrs. |
|---|---|---|
| Light Spray Oil of about 60 SUS at 100° F. | | 100 |
| Light Spray Oil of about 60 SUS at 100° F. | 1% sulfonic acid | 90 |
| Light Spray Oil of about 60 SUS at 100° F. | 1% Ester of a hydric alcohol and a fatty acid. | 97 |
| Light Spray Oil of about 60 SUS at 100° F. | 1% Ethyl silicate | 100 |
| Light Spray Oil of about 60 SUS at 100° F. | 1% Oxazoline salt of ricinoleic acid. | 10 |

Sand-blasted specimens (2" x 3" x ⅛") were dipped into the designated oil for 1 minute at room temperature, drained 2 to 20 hours at room temperature then placed in the humidity cabinet as prescribed in specification AN-O-6A except the temperature of the cabinet was 100° F. instead of 120° F.

Other sand-blasted steel specimens were dipped into the designated oil at room temperature for 5 seconds, drained 2 hours at room temperature then immersed in synthetic sea water[1] for 24 hours. The specimens were then examined for rust.

| Oil | Additive | Humidity Cabinet (hrs.) | Sea Water Immersion |
| --- | --- | --- | --- |
| Mineral Oil (550-585 SUS at 100° F.) | ---------- | 24 | Heavy Rust. |
| Mineral Oil (550-585 SUS at 100° F.) | 1% Oxazoline ricinoleic acid. | 264 | Substantially No Rust. |

Other additives can be included in compositions of this invention such as alkali and alkaline earth metal salts of petroleum sulfonic acids, amine soaps e. g. dicyclohexylamine oleate and/or stearate, long chain aliphatic amines e. g. hexyl, octyl, decyl, dodecyl, octadecyl amines, free fatty acids, e. g. oleic and stearic acid; ester of high molecular weight fatty acids; lanolin sperm oil, microcrystallic petroleum wax and the like.

The present compositions may be applied to a surface to be protected by any means such as immersing, flooding, spraying, brushing, trowelling and the like. The protective film formed on said surfaces adheres tenaciously enough to withstand handling, light polishing, movement and high temperatures for long periods of time. It can be removed when desired by a suitable solvent or by simply rubbing with a cloth.

The present invention having thus been fully described is not to be limited by any specific examples which have been presented herein solely for the purpose of illustration, but only by the following claim.

I claim as my invention:

A corrosion inhibiting composition comprising a major amount of a liquid hydrocarbon and a minor amount, sufficient to inhibit corrosion of an oxazoline salt of ricinoleic acid.

EMMETT RAYMOND BARNUM.

REFERENCES CITED

The following references are of record in the file of this patent:

UNITED STATES PATENTS

| Number | Name | Date |
| --- | --- | --- |
| 2,167,867 | Benning | Aug. 1, 1939 |
| 2,215,038 | Hodgins | Sept. 17, 1940 |
| 2,308,282 | Howland | Jan. 12, 1943 |
| 2,312,414 | Jayne et al. | Mar. 2, 1943 |
| 2,382,699 | Duncan | Aug. 14, 1945 |
| 2,398,193 | Sharp | Apr. 9, 1946 |
| 2,401,993 | Wasson | June 11, 1946 |
| 2,402,791 | Wampner | June 25, 1946 |
| 2,430,951 | Roault | Nov. 18, 1947 |
| 2,442,581 | Bishop | June 1, 1948 |
| 2,442,582 | Bishop | June 1, 1948 |

[1] $MgCl_2 \cdot 6H_2O$—11.0 gm./liter; $Na_2SO_4$ anhydrous—4.0 gm./liter; $CaCl_2$ anhydrous—1.2 gm./liter; NaCl—25.0 gm./liter.